United States Patent [19]

Zakai

[11] Patent Number: 4,913,248
[45] Date of Patent: Apr. 3, 1990

[54] PORTABLE WEIGHING SCALE

[75] Inventor: Avi Zakai, Rishon Le-Zion, Israel

[73] Assignee: Aran Engineering Development Ltd., Kfar Shmaryahu, Israel

[21] Appl. No.: 351,501

[22] Filed: May 15, 1989

[30] Foreign Application Priority Data

May 17, 1988 [IL] Israel .................................. 86408
Feb. 6, 1989 [IL] Israel .................................. 89184

[51] Int. Cl.$^4$ .......................... G01G 3/14; G01L 1/14
[52] U.S. Cl. ............................. 177/210 C; 73/862.64
[58] Field of Search .................. 177/210 C; 73/862.64

[56] References Cited

U.S. PATENT DOCUMENTS 4,585,082 4/1986 Harrington et al. ............. 177/210 C
4,629,019 12/1986 Harrington et al. ............. 177/210 C
4,738,324 4/1988 Borchard ..................... 177/210 C X
4,825,967 5/1989 Sakamoto et al. .............. 177/210 C Primary Examiner—George H. Miller, Jr.
Attorney, Agent, or Firm—Browdy and Neimark

[57] ABSTRACT

A compact electronic weighing scale whose major dimension is not substantially greater than the width of an average adult shoe and comprises a capacitive load cell adapted to be acted upon by an annular load transmission element coupled to the weighing platform. The capacitive load cell and the load transmission element are so dimensioned that the change in capacitance of the load cell in response to a load acting upon the weighing platform is substantially uniform regardless of the point of application of the load on the weighing platform.

13 Claims, 9 Drawing Sheets

PORTABLE WEIGHING SCALE

FIELD OF THE INVENTION

This invention relates to a weighing scale having a capacitive load cell, the capacitance of which varies as a function of the applied load, thereby permitting the weight to be determined electronically.

BACKGROUND OF THE INVENTION

Weighing scales such as, for example, bathroom scales, have long been known wherein a weighing platform is resiliently mounted with respect to a casing and wherein a load transmission system, pivotally mounted within the casing, serves to transmit the load acting on the platform to a load cell located within the casing so as to generate an analog signal corresponding to the load.

Typically, such known weighing scales are provided with a split casing comprising displaceable upper and lower sections resiliently mounted with respect to each other. The upper section constitutes a weighing platform for applying a load to the load cell by means of a load transmission system pivotally mounted within the casing.

Capacitive load cells have been proposed for such weighing scales, provided in the form of a parallel plate capacitor whose capacitance varies inversely as a function of the distance between the capacitor plates. Consequently, as a load is applied to the weighing platform, the distance between the capacitor plates varies and the capacitance varies proportionally. A problem with such a system is to ensure uniformity of measurement, whereby the capacitance of the load cell changes by a uniform amount regardless of where on the weighing platform the load is applied.

One approach to this problem has been rigidly to connect the parallel plate capacitor to corresponding upper and lower portions of a rectangular spring whose side portions are rigidly coupled to the respective lower and upper sections of the casing. As a load is applied to the weighing platform, the two sections of the casing are displaced away from each other and thereby elastically deform the spring so as to move the two plates of the capacitor further apart. As the load is released, the spring returns to its original rectangular shape, thereby restoring the capacitance of the load cell to its original value.

Clearly, the resolution of such a measuring system depends on the proportional change in capacitance of the load cell for a given applied load. Consequently, for a capacitor of predetermined dimensions, the change in capacitance is a function of the magnitude of the applied load and the elastic modulus of the spring. In other words, the sensitivity of such an arrangement is a function of the elasticity of the spring. Consequently, an arrangement which is suitable for measuring an applied load of, say, 1 kgf, will generally not be suitable for measuring an applied load of 10 kgf unless the elastic modulus of the spring is increased by a factor of 10. If this is not done, then there exits the danger that the increased load will simply collapse the spring unrecoverably beyond its elastic limit.

However, in order to increase the rigidity of the spring as required (i.e. by increasing its elastic modulus), the dimensions of the spring must be increased accordingly in order that the increased load may be measured with the same sensitivity as the original load of 1 kgf.

Such an arrangement, therefore, becomes cumbersome when measuring large loads since the dimensions of the spring as well as those of the weighing platform become unwieldy.

SUMMARY OF THE INVENTION

It is an object of the invention to provide a weighing scale including a capacitive load element in which the drawbacks associated with hitherto proposed methods are significantly reduced.

According to a broad aspect of the invention, there is provided in a weighing scale:

a capacitive load cell comprising a pair of spaced apart electrically conductive plates, at least one of which is capable of resilient deformation, said plates being insulated with respect to each other, and a load transmission element adapted to bear on the capacitive load cell so that in response to a load applied to the load transmission element the plates are resiliently displaced towards each other thereby increasing their capacitance;

said capacitive load cell and load transmission element being so dimensioned that the change in capacitance of the capacitive load cell is substantially uniform regardless of where on the load transmission element the load is applied.

According to a second aspect of the invention, there is provided a weighing scale including:

a split casing comprising mutually displaceable first and second sections, a pair of spaced apart electrically conductive plates constituting a capacitive load cell, at least one of said plates being capable of resilient deformation, said plates being fixedly mounted to the first section whilst being insulated with respect to each other;

a load transmission element coupled to the second section and adapted to bear on the capacitive load cell so that in response to a load applied to the second section the plates are resiliently displaced towards each other thereby increasing their capacitance, signal processing means coupled to the capacitive load cell and responsive to a change in capacitance thereof for generating an output signal representative of the applied load, said capacitive load cell and load transmission element being so dimensioned that the output signal is substantially uniform regardless of where on the second section the load is applied, and display means for displaying data representative of the output signal.

Preferably, in a load cell according to the invention, the capacitive element is provided by means of a substantially circular parallel plate capacitor whose lower plate is rigidly mounted on the lower section of the casing and whose upper plate is separated from the lower plate by means of an annular insulating spacing element provided around the periphery of the two plates. A load applied to the upper section of the casing so as to displace the two sections of the casing towards each other, impinges via an annular load transmission element onto the upper capacitor plate, thereby displacing it towards the lower capacitor plate. In so doing, the capacitor is no longer, strictly speaking, a parallel plate capacitor since the distance between the two plates is somewhat less at the centre thereof than at the circumference.

Preferably, the dimensions of the load cell and of the annular load transmission element are chosen such that a load applied anywhere on the weighing platform produces a substantially uniform difference in the capacitance of the load cell.

furthermore, such an arrangement lends itself to miniaturization whilst still being capable of measuring relatively large loads without detracting from the sensitivity of the resultant measurements.

BRIEF DESCRIPTION OF THE DRAWINGS

The invention will now be described by way of non-limiting example only, with regard to a portable weighing scale and with reference to the accompanying drawings, in which.

DETAILED DESCRIPTION OF PREFERRED EMBODIMENTS

Figure 1:
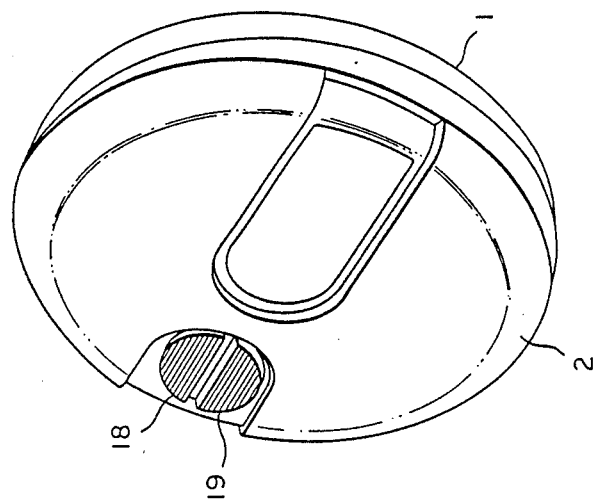
FIG. 1 is a perspective view of a portable weighing scale in accordance with the invention.
Figure 2:
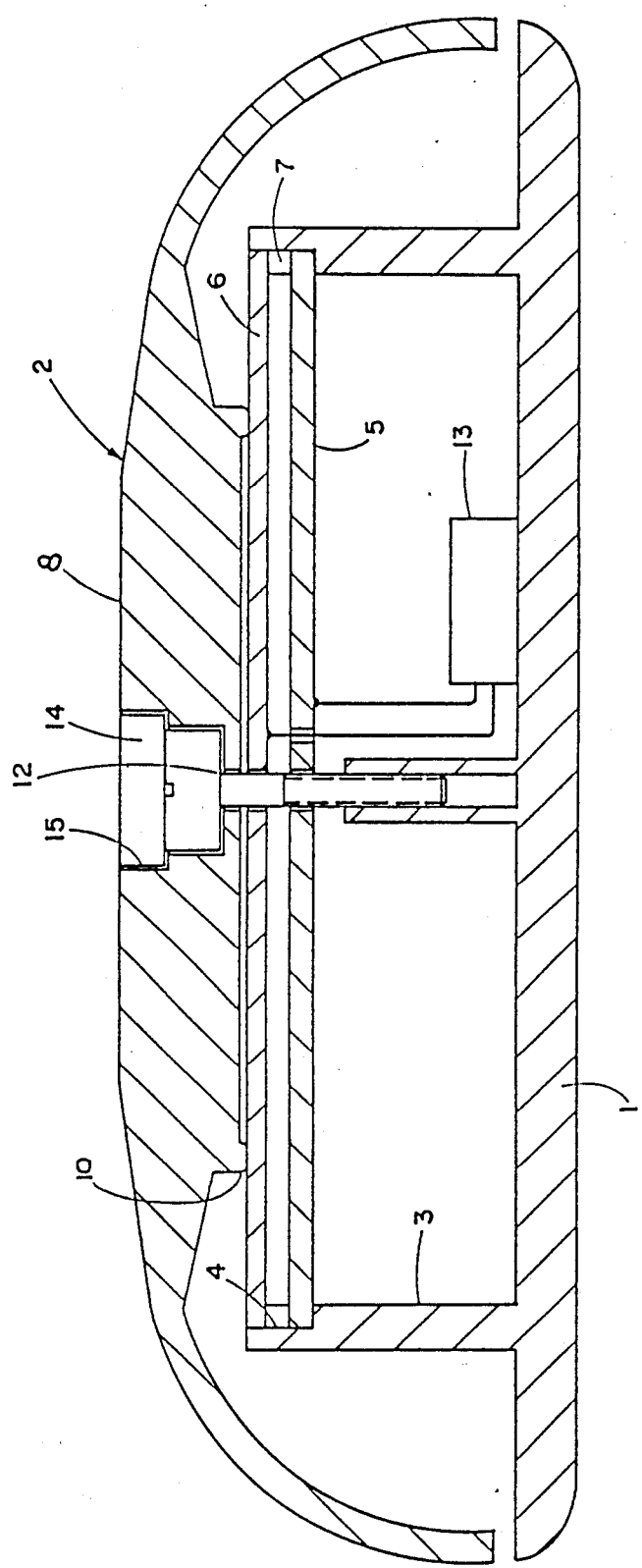
FIG. 2 is a cross-sectional elevation of the weighing scale shown in FIG. 1.

As seen in FIGS. 1 and 2 of the drawings, the portable weighing scale in accordance with the invention comprises an annular base member 1 and a dish-shaped cover member 2. Extending upwardly from the base member 1 is an annular support structure 3, provided at an upper portion thereof with an internal recess 4. A first circular plate 5 made of metal is supported by the bearing ring 3 such that a periphery of the first plate 5 is seated upon the lower surface of the recess 4. A second circular plate 6, also made of metal, is supported around its periphery within the recess 4 and above the first plate 5 by means of an annular separating element 7 constituting a spacing means. The two circular plates 5 and 6 are thus separated a predetermined amount at their peripheries corresponding to the thickness of the annular separating element 7.

The upper section 2 of the split casing is formed of a circular planar disc constituting a platform 8 which curves around at its edges so as to be integral with a cylindrical skirt portion 9. On the under side of the platform 8 there is formed a circular rim 10 constituting an annular load transmission element which impinges on the second circular plate 6. Thus, the line of contact between the rim 10 and the second plate 6 is a circle which is concentric with the two plates 5 and 6 but has a somewhat smaller radius.

A pair of coaxial apertures 11 and 12 are formed, respectively, in the first and second plates 5 and 6, and permits the through passage of conducting wires from the two plates to a load cell circuit 13 whose output is coupled to an LCD display unit 14 mounted in a recess 15 within the platform 8.

Switches 18 and 19 are incorporated in the cover member 2 and are coupled with the circuit 13 so that on depressing the switch 18, a weight-measuring module is connected in circuit whilst on depressing the switch 19 a time-measuring module is connected in circuit.

With a weighing scale as just described, the presence of a downwardly directed load on the platform 8 tends to displace the two sections 1 and 2 of the casing towards each other and as a consequence, a load is transmitted via the annular load transmission element 10 to the second conducting plate 6. The two conducting plates 5 and 6 constitute a capacitive load element whose capacitance varies according to the average distance separating the two plates. Thus, the transmission of the load results in a resilient distortion of the second plate 6 such that the distance separating the two plates between the annular separating element 7 decreases. When the load is removed from the platform 8, the second plate returns to its unloaded state thereby restoring the two sections 1 and 2 of the casing to their original displacement.

It is a feature of the invention that an applied load is annularly distributed along the second capacitor plate 6 via the load transmission element 10, such that the magnitude of the effective point load at any location along the annulus varies as a function of the distance of the location from the point of application of the load. IT has been determined experimentally that by adjusting the dimensions of the capacitive load cell such that the diameter of the conducting plates 5 and 6, the diameter of the annular load transmission element 10, the height of the annular separating element 7 and the width of the plates 5 and 6 are approximately in the proportions 67:50:1.5:1.2, the change in capacitance of the load cell is substantially uniform regardless of where on the platform 8 the load is applied.

Figure 3:
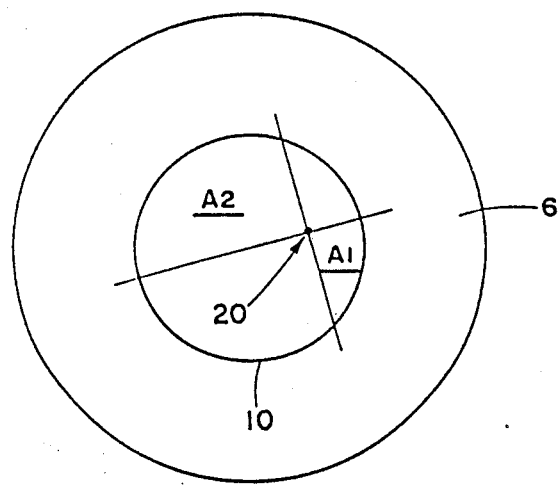
FIG. 3 is a schematic plan view showing an aspect of the load transmission useful in explaining qualitatively the operation of a capacitive load cell in accordance with the invention.

Reference will now be made to FIGS. 3 and 4 of the drawings in the following explanation of how it is believed that the desideratum that the change in capacitance of the load cell is substantially independent of the region of application of the load, is achieved.

FIG. 3 shows a plan view of the upper plate 6 and the annular load transmission element 10. A load applied within the boundary of the load transmission element 10 at a point 20 is distributed along the rim of the load transmission element 10 as an inverse function of the distance of the point 20 from the rim.

In FIG. 3, the area bounded by the load transmission element 10 is divided into two sections, $A_1$ and $A_2$ where along the perimeter of the rim bounding section $A_1$ the component of the applied load is more concentrated whilst along the perimeter of the rim bounding the section $A_2$ the component of the applied load is relatively less concentrated. It can be seen, qualitatively, that in section $A_1$ a relatively concentrated load is applied along a relatively small length of rim whilst in section $A_2$ a relatively small load is applied along a corresponding greater length of rim. The net result is that the fractional change in capacitance of the load cell is substantially the same as if the same load were applied at the centre of the load transmission element 10.

Figure 4A:
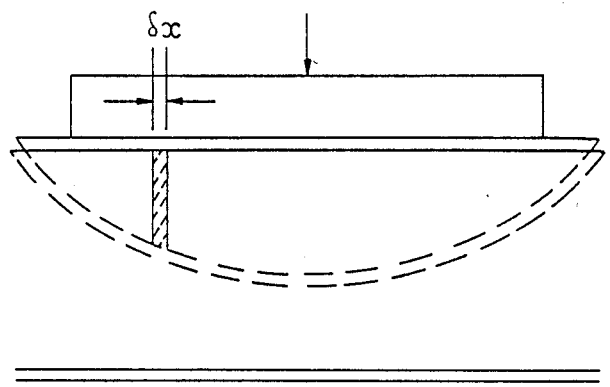
FIGS. 4a and 4b relate to FIG. 3 and show deflection curves for centrally and eccentrically applied loads.
Figure 4B:
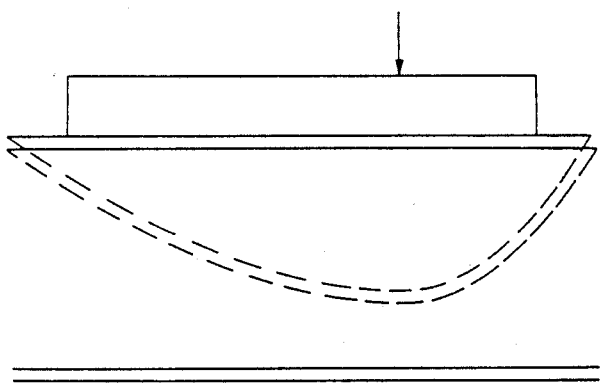

This effect will be more readily understood with reference to FIGS. 4a and 4b of the drawings which show deflection curves for the arrangement of FIG. 3 when centrally and eccentrically loaded, respectively. It should be understood that it is the load transmission element which is centrally or eccentrically loaded, and not the upper capacitor plate 6. Thus, as explained above with reference to FIG. 3, as the radial distance of the applied load from the centre of the load transmission element varies, so too does the distribution of the load around the periphery of the load transmission element. Regardless of the point of application of the load to the load transmission element, the load is always applied to the capacitive load cell along the annular point of contact of the load transmission element therewith.

In FIG. 4a the deflection is symmetrical about the central vertical axis, the deflection of the upper capacitor plate being greatest at the centre, corresponding to the point of application of the load. In FIG. 4b the deflection is still greatest at the point of application of the load but, owing to the asymmetry of the arrangement, the deflection curve is skew. Furthermore, it may be observed that the maximum deflection in FIG. 4b is greater than that in FIG. 4a, whilst the area under FIG. 4a exceeds that of FIG. 4b.

Bearing in mind that mathematically the area, A, under a curve f(x) from $x=0$ to $x=x_{max}$ is given by:

$$A = \int_0^{x_{max}} f(x) dx$$

it will be seen that the area A corresponds to the sum of the elemental deflection for each element $\delta x$.

Consequently, it would appear from FIGS. 4a and 4b that there are two opposing effects influencing the change in capacitance of the load cell in response to an applied load, depending on the point of application of the load. On the one hand, for a centrally applied load, the net average deflection is greater than for the same load applied eccentrically but, on the other hand, the maximum deflection (corresponding to the point of application of the load) increases as the load is applied eccentrically, the maximum deflection occurring when the load is applied at the circumference of the load transmission element.

It has been found that providing the dimensions of the capacitive load cell and the load transmission element are proportioned as above, these two opposing effects compensate each other and a substantially uniform change in capacitance is obtained.

In the arrangement described above, in spite of the near uniformity of measurement, there may still be a very slight non-uniformity of measurement whereby a load applied at the centre of the platform 8 produces a somewhat greater displacement at the centre of the upper plate 6 than the same load applied eccentrically. This may occur, for example, owing to manufacturing tolerances, as a result of which the dimensions of the capacitive load cell do not fall within the prescribed range. Depending on the overall size of the platform 8 as well as the particular application for which the weighing scale is to be used, this slight non-uniformity may or may not be significant.

Any non-uniformity may be detected during inspection by applying a load at varying positions along the load transmission element and observing the resultant output. Whilst ideally the output should be uniform, in accordance with the preferred dimensions described above, it may in fact be found that the output increases as the point of application of the load increases radially from the centre of the load transmission element.

A non-uniformity of this type may be compensated for by shaping one or both of the conducting plates 5 and 6 such that an applied load produces a proportionally greater fractional change in the separation between the two plates at the centre of the platform 8. It will, of course, be borne in mind that the capacitance of a parallel plate capacitor varies inversely as the distance separating the two plates. Consequently, by so shaping the two plates 5 and 6 that they are closer together at their centre than tat their circumference, it may be arranged that a load applied eccentrically to the weighing platform 8 produces the same fractional change in capacitance of the load cell as an identical load applied centrally thereto.

Alternatively, it may be found that the output falls as radial distance of the applied load from the centre of the load transmission element increases.

This type of non-uniformity may be compensated for by so shaping one or both of the conducting plates 5 and 6 that, when unloaded, their central displacement is greater than their peripheral displacement.

Figure 5A:
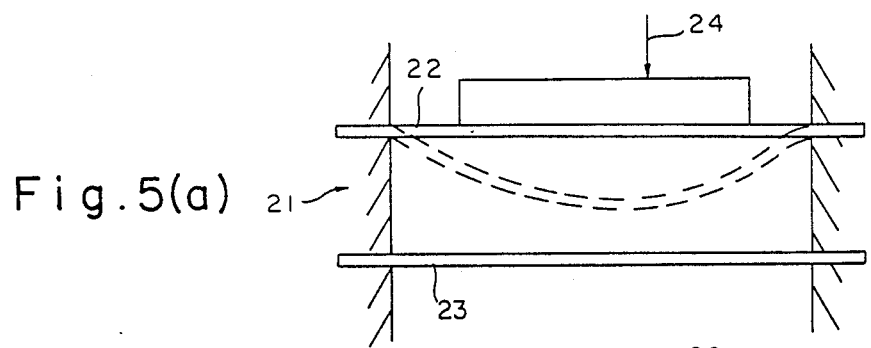
FIGS. 5a, 5b, 5c and 5d are cross-sections of various preferred capacitive load cells according to the invention.

These effects can be explained qualitatively by reference to FIG. 5a which shows in cross-section a parallel plate capacitor 21 having upper and lower plates 22 and 23, respectively. A load 24 applied eccentrically via an annular load transmission element along the plate 22 will cause a deflection shown in dotted line from which it is seen that the deflection is greatest at the point of application of the load 24. Consequently, the distance between the upper plate 22 and the lower plate 23 of the capacitor 21 is least at the point of application of the load 24 to the upper plate 22. Clearly, if the load 24 were applied centrally to the load transmission element, the deflection would then be greatest at the centre of the upper plate 22, and it is for such deflection that the capacitive load cell is calibrated.

Figure 5B:
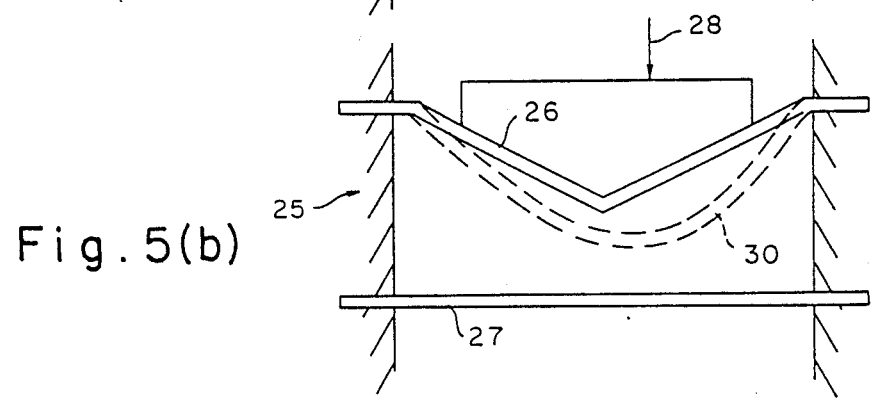

Referring now to FIG. 5b, there is shown in cross-section a nominally parallel plate capacitor 25 comprising upper and lower plates 26 and 27, respectively. The upper plate 26 is symmetrically deformed so that it is closest to the lower plate 27 at the centre of the two plates, its distance from the lower plate 27 varying linearly between its centre and each of its two ends. When such a capacitor 25 is used in a capacitive load cell according to the invention, the plates 26 and 27 are circular in plan view, the upper plate 26 resembling an inverted hollow cone supported by a peripheral flange around its base.

Consider now a load 28 applied eccentrically to the load transmission element. The load 28 produces a deflection in the upper plate 26 shown, qualitatively, by the dotted line 30. As explained above, with reference to FIG. 5a, the deflection of the upper plate 26 is greatest at the point of application of the load 28. However, it will be clear from the figure that the fractional displacement (equal to the deflection divided by the original separation from the lower plate 27) of the upper plate 26 at the centre of the two plates is greater than for the arrangement shown in FIG. 5a.

A load cell employing the capacitor 25 described above with reference to FIG. 5b, is so calibrated that the magnitude of an applied load is determined as a function of the differential capacitance of the load cell which, in turn, varies as a function of the proportional change in displacement to the distance between the two plates 26 and 27 when the upper plate 26 is unloaded.

Figure 5C:
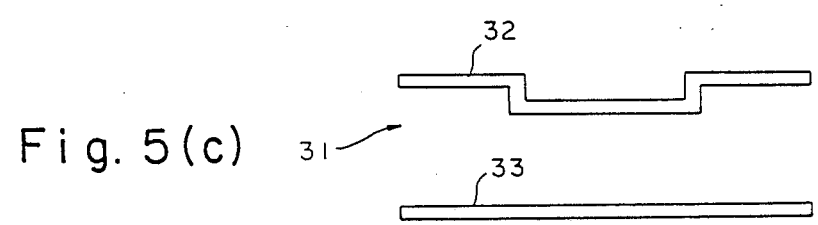
Figure 5D:
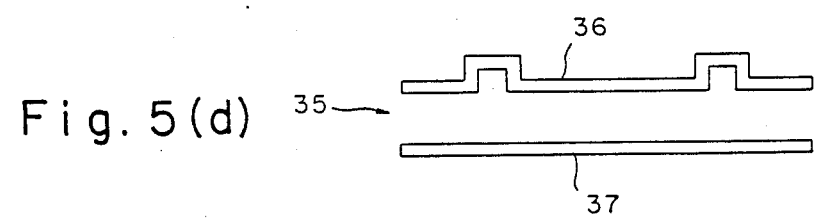

Depending on the exact nature of the measured nonuniformity, correction may be obtained by employing different shapes for either the upper or lower plates of the capacitor, either singly or in combination. For example, FIG. 5c shows in cross-section a capacitor 31 comprising upper and lower plates 32 and 33, respectively. The upper plate 32 is shaped so that over a central portion thereof it is uniformly displaced from the lower plate 33 a smaller distance than at the corresponding peripheral portions thereof. FIG. 5d shows in cross-section an alternative arrangement of a capacitor 35 having upper and lower plates 36 and 37, respectively. The central and circumferential displacements of the upper plate 36 from the lower plate 37 are equal, whilst an intermediate annular portion of the upper plate 36 is shaped so that it is uniformly displaced from the lower plate 37 a greater distance than the central and circumferential displacements.

It will be understood that whilst in FIGS. 5b, 5c and 5d the upper plates of the capacitor are so formed as to compensate for non-uniformity of measurement, the lower plates of the capacitors could instead be formed of similar cross-sections. Alternatively, both the upper and lower plates could be formed as described, if desired, the "unloaded" displacement between the plates being adjusted accordingly.

It will further be appreciated that whilst the capacitive load cells described above with reference to FIGS. 5a to 5d employ sheet metal plates of uniform thickness, it is possible also to use material of non-uniform thickness providing the criteria described above are fulfilled.

Additionally, other modifications may be effected to the structure of the capacitive load cell and load transmission element, without departing from the spirit of the invention. Thus, is desired, the load transmission element 10 need not be annular but can instead have a solid surface in contact with the upper plate 6. When a load is applied via such a load transmission element to the load cell, the upper plate 6 deflects such that the load transmission element maintains contact with the upper plate 6 only around the periphery of the load transmission element. Consequently, even with such a modified load transmission element, annular contact between the load transmission element and the load cell is obtained.

Although the capacitor plates 5 and 6 in the preferred embodiment are circular, any shape may be employed so long as the area of the plates bounded by the spacing means is circular.

Figure 6:
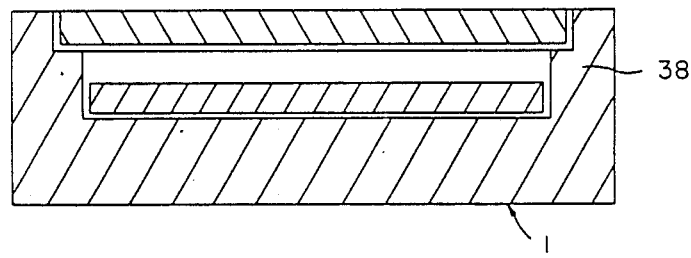
FIG. 6 shows an alternative form of spacing means for use in a capacitive load in accordance with the invention.

FIG. 6 shows an alternative form of spacing means, wherein instead of employing a discrete annular separating element as described above, the base member 1 is moulded so as to provide integral therewith a stepped spacing means 38.

Figure 7A:
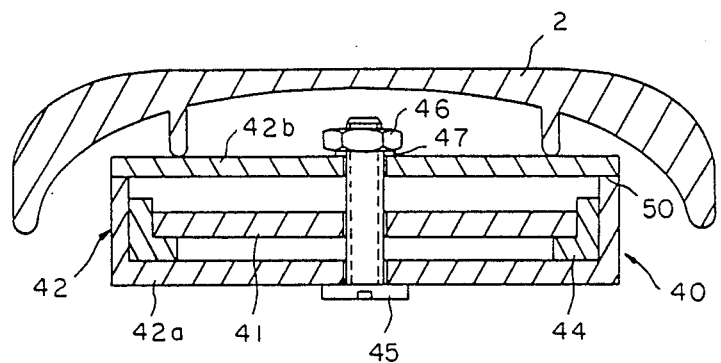
FIGS. 7a, 7b and 7c show, respectively, an alternative configuration for a capacitive load cell in accordance with the invention and two alternative configurations for supporting the lower capacitor plate.

Referring now to FIG. 7a, there is shown an alternative configuration for a capacitive load cell in accordance with the invention. The capacitive load cell, designated generally as 40, comprises a first metal plate 41 surrounded by a metal casing 42 constituting a second plate. The metal casing comprises a substantially U-shaped lower section 42a and a flat upper section 42b. The first plate 41 is insulated from the second plate by means of a recessed annular spacing element 44.

The first plate 41 and both lower and upper sections 42a, 42b of the second plate 42 are provided with substantially central and coaxial apertures for accommodating a locking screw 45 which is adapted to tighten the load cell, thereby adjusting the unloaded displacement of the two capacitor plates, by means of a nut 46 and washer 47. The locking screw 45 clamps the load cell 40 so as to prevent disarrangement of the component sections 42a and 42b of the second plate. Additionally, it permits adjustment of the capacitance of the unloaded load cell for the purpose of calibration as will be described later with respect to FIG. 11 of the drawings. It will be understood that the locking screw must be insulated from the two capacitor plates so as to prevent electrical contact therebetween. This is most easily achieved by forming the locking screw 45 out of plastics.

An aperture 49 provided in the lower section 42a allows the through-passage of a first connecting wire (not shown) to the first plate 41. A second connecting wire (also not shown) is connected directly to the lower section 42a. The first and second connecting wires permit the capacitive load cell to be connected to the load cell circuit 13 (FIG. 2).

The cover member 2 comprises an annular load transmission element 50 which impinges on the upper section 42b of the capacitive load cell in like manner to that explained above with reference to FIG. 2 of the drawings. The lower section 42a of the load cell is supported on the base member 1 of the casing, by means of an annular support 51 as shown in FIGS. 7b and 7c.

Figure 7B:
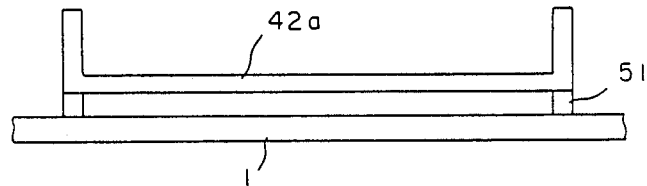

In FIG. 7b the support 51 is shown acting at the edges of the lower section 42a of the metal casing 42. Consequently, the reactive forces which result from a load applied via the load transmission element 50 to the upper section 42b act directly through the side portions of the metal casing 42 without causing any deflection of the lower section 42a.

Figure 7C:
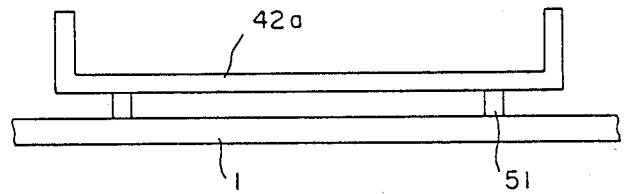

In FIG. 7c, the support 51 is shown acting in line with the load transmission element 50. In this case, the reactive forces will be equal and opposite to the transmitted load and will act in line therewith. This results in an identical deflection of the lower section 42a to that produced in the upper section 42b and gives rise to a magnification by a factor of 2 of the change in capacitance of the load cell, as compared to the configuration shown in FIG. 2 and FIG. 7b (assuming that sections 42a and 42b have identical elasticities).

It will be appreciated that all the embodiments described with reference to FIGS. 7a, 7b and 7c are characterized in that the capacitive load cell includes an outer metal casing constituting one of the capacitor plates. Such an arrangement acts as an effective screen against stray electromagnetic signals and provides effective voltage suppression.

Having now described various embodiments for the construction of the capacitive load cell itself, there will now be described a preferred embodiment of a weighing scale incorporating such a capacitive load cell. As seen in FIG. 1, the preferred weighing scale, according to the invention, employs a weighing platform whose major dimension is substantially no greater than the average adult foot. Such a weighing scale can be readily packed away by a traveller in the smallest suitcase or briefcase and is used by being placed on the floor so that the person wishing to weigh himself merely steps on and off the platform, with one foot, the other foot being momentarily raised.

Since the major dimension of the weighing platform constituting the upper section of the split casing must be such as to accommodate the capacitive load cell, such an arrangement permits a capacitive load cell of relatively small dimensions to be employed. Under such circumstances, the capacitive load cell with the relatively simple load transmission element described above represents a cost-effective alternative to the conventional strain gauge with its more complex load transmission system. Furthermore, it will be appreciated that a conventional capacitive load cell would be unsuitable in such a miniature weighing scale because the reduced dimensions of the spring enclosing the capacitor would result in the spring having a very low elastic modulus. Such a system would therefore not be suitable for measuring relatively heavy loads, since the upper plate might deform inelastically and might even be deflected so much as to make contact with the lower plate.

When a weighing procedure is required the switch 18 is actuated so as to switch on the weight module. The weight scale is then placed on the floor and the person who wishes to weigh himself places one foot on the platform 8 with the other foot momentarily raised, whereupon the weight of the person is displayed on the liquid crystal display 14. This weight will now be retained in the memory of the device and can be displayed at will. Thus, if upon a subsequent weighing the person wishes to know how his or her weight compares with the previously recorded weight, all the person has to do is to inspect the original display and then replace the scale on the ground, step on it again and the new weight will be displayed.

the weighing scale just described offers the possibility of determining the weight, for example, of a packed suitcase, this being particularly required when travelling. When it is desired to establish the weight of the suitcase, the following procedure is adopted. The person first of all steps on the scale as described above when he wishes to weigh himself, whereupon the person's weight is displayed. Without moving the scale and within a predetermined time interval (say 5 sec.), the person again steps momentarily on the scale, this time holding the suitcase. The display will now show the difference of the two weighings, i.e. the weight of the suitcase.

Figure 8:
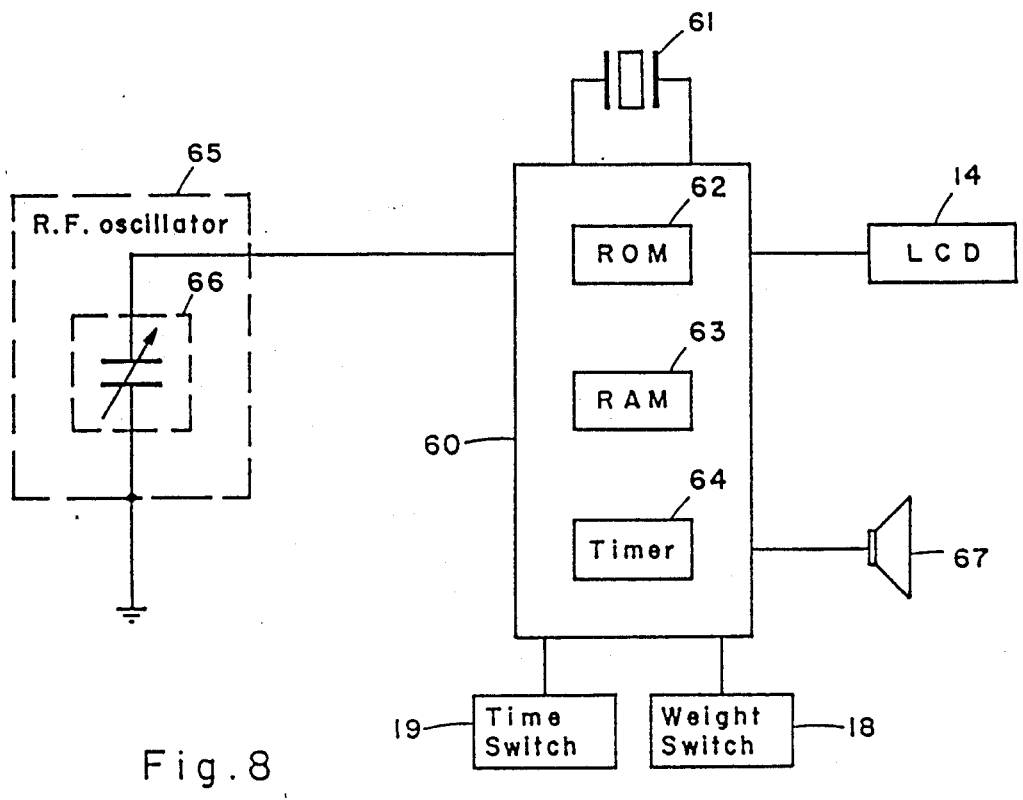
FIG. 8 is a block diagram of a load cell circuit and display means assembly comprised within the portable weighing scale.

Reference will now be made to FIG. 8 of the drawings in which is shown a block diagram indicating the functional operation of the circuit 13 incorporated in the weight scale. The circuit 13 comprises a microprocessor 60 whose internal clock (not shown) is regulated by a quartz crystal 61. Associated with the microprocessor 60 are a ROM (read only memory) 62, a RAM (random access memory) 63 and a timer 64. The ROM 62, RAM 63 and the timer 64 may be accommodated within the microprocessor 60 or, alternatively, may be constituted by separate discrete integrated circuits.

Connected to an input of the microprocessor 60 is an r.f. oscillator circuit 65 incorporating the capacitive load cell 66 adapted to produce a variable frequency square wave signal whose frequency varies as a function of the capacitance of the load cell. This signal is fed to an arithmetic logic unit (not shown) within the microprocessor 60.

The weight module is adapted to calculate weights as follows. When somebody stands on the scale, the deflection of the capacitive load cell 66 causes the capacitance thereof to alter, thereby altering the frequency of the square wave signal generated by the r.f. oscillator 65. Integrating circuits incorporating, for example, OP AMPs, for producing square wave signals whose frequency varies as a function of capacitance, are well known in the art and need not therefore be discussed in further detail.

The square wave signal produced by the r.f. oscillator 65 varies from zero to a maximum and then falls again to zero when the person steps off the scale. Unlike conventional scales, which measure weight in the steady-state condition, the scale according to the invention determines the weight during the initial transient state and thus produces an output in a very short time. The varying frequency square wave signal produced by the r.f. oscillator 65 is sampled by the microprocessor 60 and stored within the RAM 63.

The switches 18 and 19 are connected to the microprocessor 60 for altering its mode of operation in accordance with an instruction set stored within the ROM 62. Outputs of the microprocessor 60 are connected to the LCD 14 and to a loudspeaker 67.

Figure 9:
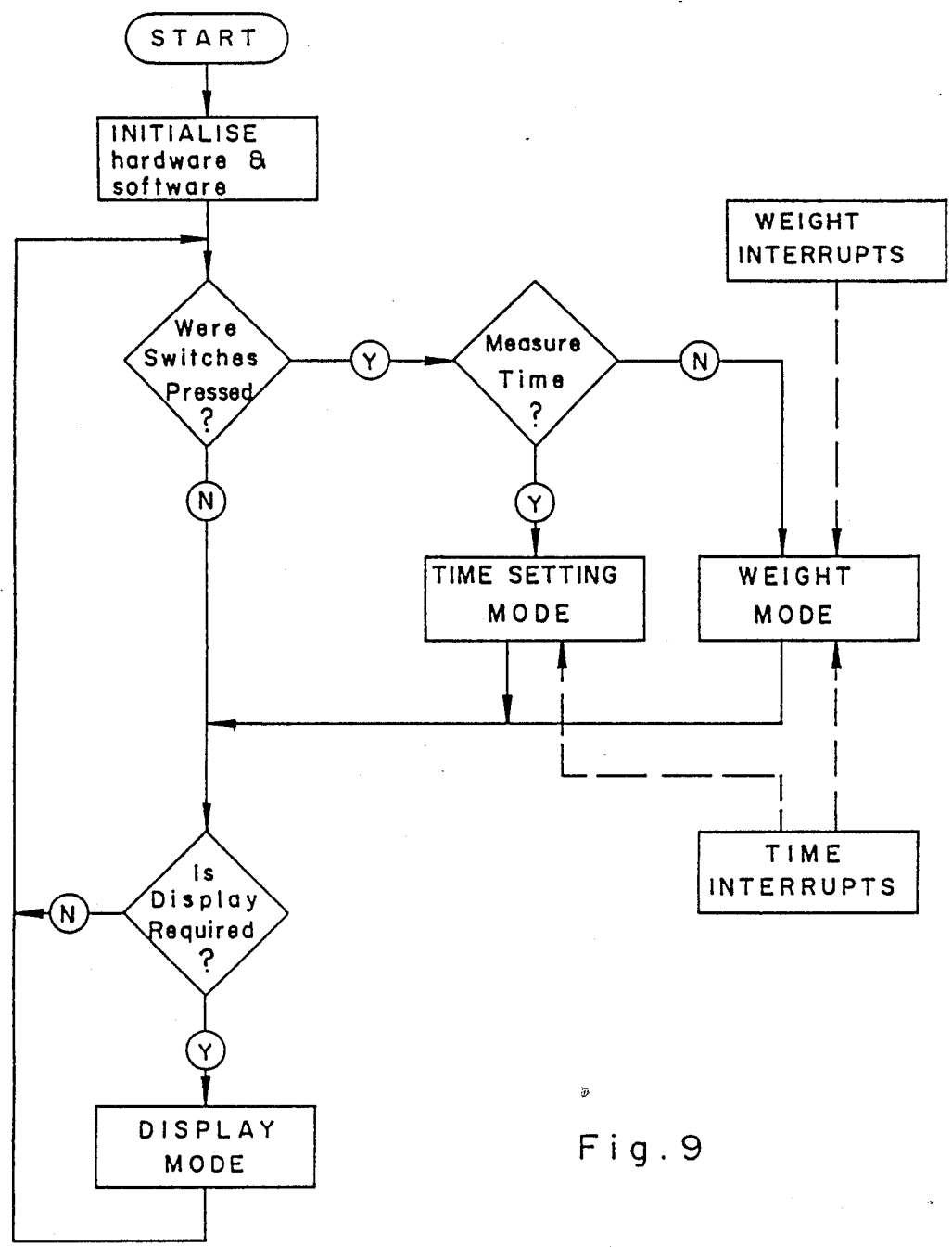
FIG. 9 is a flow diagram illustrating essential features of an instruction set stored in a ROM forming part of the assembly illustrated in FIG. 8.

Referring to FIG. 9, there is shown a flow diagram which illustrates the essential features of the instruction set stored within the ROM 62. It has already been stated that the system is adapted to measure and display either weight or time. The microprocessor 60 determines which mode of operation is required, in accordance with the setting of the respective switches 18 and 19. If weight measurement is required, then the weight module is activated in accordance with logic to be described later with reference to FIG. 10. If time measurement is required, then the time module is activated. The time module may be a standard clock integrated circuit, as is well known in the art, and therefore its operation will not be discussed further. The loudspeaker 67 shown in FIG. 8 produces an alarm signal when the time module is used as an alarm clock.

If neither of the switches has been pressed, a further check is undertaken in order to determine whether the display is required, permitting the display mode to be invoked as appropriate.

When determining weight, a series of pulses is fed to the microprocessor 60, the period of each pulse being determined as explained below with reference to FIG. 10 Each pulse constitutes a "weight interrupt" shown in FIG. 9. Likewise, the "time interrupts" shown in FIG. 9 are generated by the timer 64 (FIG. 8) and these interrupts must be generated continuously regardless of whether weight or time is being measured, in order that the time stored within the timer 64 will always be up-to-date. Consequently, the time interrupts are fed both to the weight module and the time setting module.

When used in the weight mode, one of the two switches 18 and 19 may also function as a display toggle for converting the displayed weight from kilograms to pounds, or vice versa. Thus, the setting of these switches is also monitored by the microprocessor 60 and the display 14 is activated accordingly.

Figure 10:
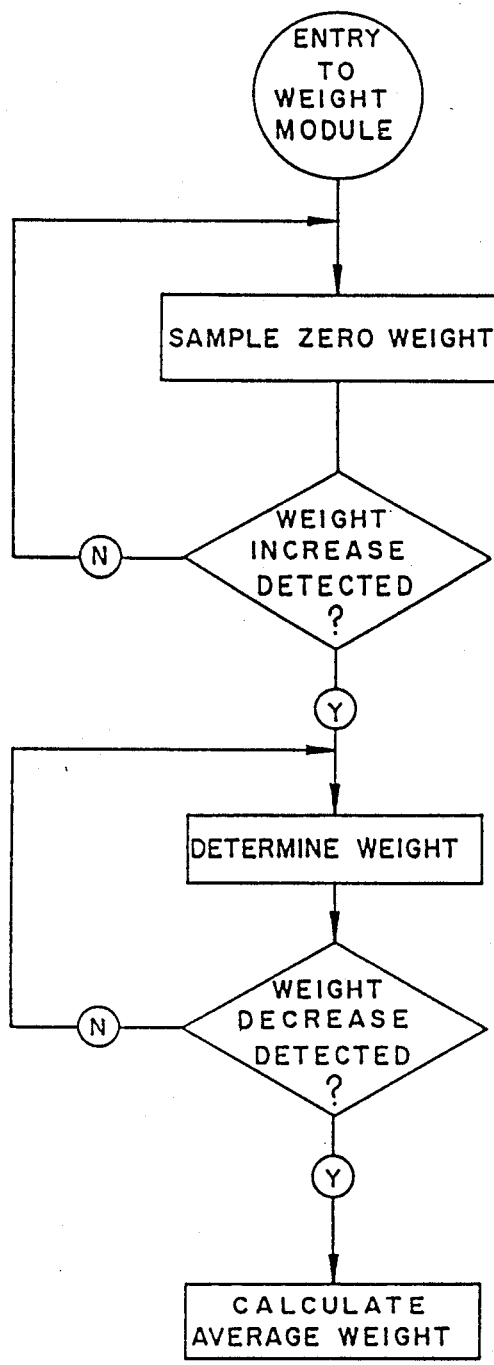
FIG. 10 is a logic diagram of a weight module.

FIG. 10 shows a flow diagram of the logic employed by the weight module. As soon as the weight module is activated, the zero weight is determined corresponding to no load being applied to the weighing platform (FIG. 2). When a weight increase is detected, the weight is determined in accordance with an algorithm stored within the ROM 62, the principles of which algorithm are briefly as follows. The periods of 256 successive square wave pulses generated by the r.f. oscillator 65 are determined, the average period being employed so as to determine the capacitance of the load cell 66 and hence the magnitude of the applied load. This process is repeated 50 times, thereby permitting a histogram to be generated, showing for each calculated weight its frequency of occurrence. A weighting factor is applied to the histogram so as to determine the magnitude of the applied load.

Having described the operation of the measuring circuit, its method of use will now be explained. Using the weight selection switch 18, the device is set to operate in the weight measuring mode. A person then stands on the scale with one foot and the loudspeaker 67 emits a "beep" to confirm that the weight has been measured. The measured weight appears on the display 14. An additional measurement is effected after a short, first predetermined time interval (e.g. one second) and the display shows the difference between the two measurements. After a second predetermined time interval, the display returns to the lower of the two readings. Thus, a traveller may first weigh himself unloaded, and then carrying his luggage, the display indicating the weight of the luggage alone.

Owing to manufacturing tolerances, the capacitance of the load cell at zero loading is subject to variation and this must be compensated for prior to dispatch from the factory. This compensation is accomplished by adjusting the tightness of the screw 12 shown in FIG. 2 or of the screw and nut, 45 and 46, shown in FIG. 7, so as to alter the separation between the two plates of the capacitive load cell when unloaded. It will be understood from the foregoing description, that variations in the capacitance of the load cell give rise to corresponding variations in the frequency of the output signal, measurement of which is indicative of the value of the applied load.

Figure 11:
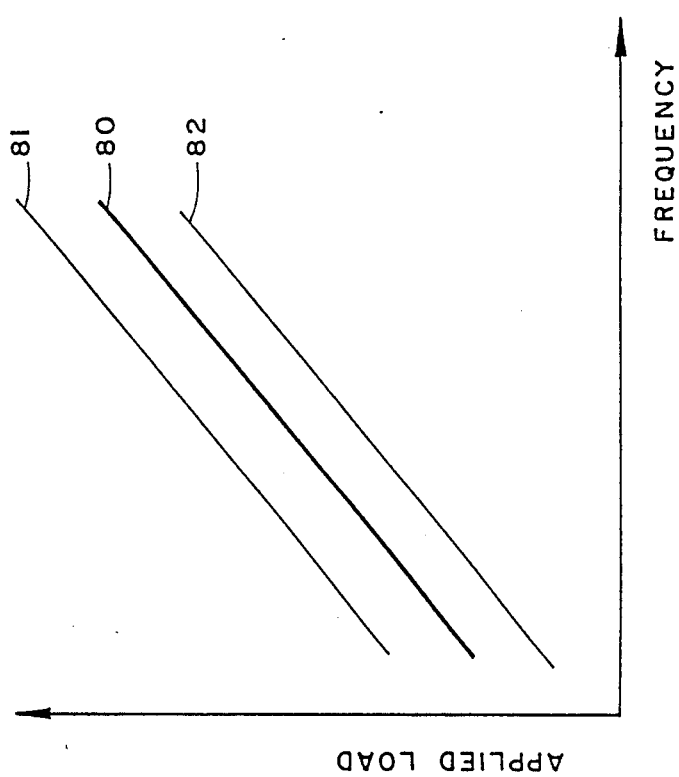
FIG. 11 shows a calibration curve.

Referring to FIG. 11, there is shown a simplified graph of applied load against frequency, comprising a straight line having a positive gradient. In fact, the graph will more correctly be piecewise linear having a plurality of segments, the gradient of each of which is defined for predetermined ranges of applied load. The principle of calibration is identical to the simple case described with reference to FIG. 11 and, therefore, for the sake of explanation reference will only be made to the simplified graph.

The heavy line 80 shown in FIG. 11 represents a standard curve for which the scale is correctly calibrated. The calibration curve 80 is obtained for a positive tightening of the screw 45 and nut 46 (FIG. 7) so that even in the unloaded state, there exists residual deflection of the upper capacitor plate. It is then desired that for all other capacitive load cells manufactured, the calibration curve should be identical to the standard curve 80.

Generally, owing to manufacturing tolerances, the calibration curves of different capacitive load cells will lie either above or below the standard curve 80. Thus, curve 81, lying above the standard curve 80, corresponds to the situation where the zero loading is greater than the corresponding zero loading for the standard curve 80. This may be compensated for by relaxing somewhat the tightness of the screw 45 and nut 46 (FIG. 7) until curve 81 meets the standard curve 80. Similarly, curve 82, lying beneath the standard curve 80, corresponds to the situation where the zero loading is less than that for the standard curve 80. This may be compensated for by tightening further the screw 45 and nut 46 until the curve 82 meets the standard curve 80.

It is furthermore arranged that the calibration described above is performed at a known, predetermined temperature. Capacitance variations of the load cell will also occur owing to ambient temperature fluctuations and, if not compensated for, would adversely affect the accuracy of the scale. Ambient temperature fluctuations are compensated for by adapting the microprocessor in the scale to measure the frequency of the output signal both prior and subsequent to the application of a load to the weighing platform. The difference in value between the two measured frequencies is then used to give an indication of the value of the applied load. Temperature fluctuations will affect both readings equally and will therefore have no effect on the difference signal, which consequently gives a true indication of applied load, regardless of changes in ambient temperature.

I claim:

1. In a weighing scale:
   a capacitive load cell comprising a pair of spaced apart electrically conductive plates, at least one of which is capable of resilient deformation, said plates being insulated with respect to each other, and
   a load transmission element adapted to bear on the capacitive load cell so that in response to a load applied to the load transmission element the plates are resiliently displaced towards each other thereby increasing their capacitance;
   said capacitive load cell and load transmission element being so dimensioned that the change in capacitance of the capacitive load cell is substantially uniform regardless of where on the load transmission element the load is applied.

2. A weighing scale including:
   a split casing comprising mutually displaceable first and second sections,
   a pair of spaced apart electrically conductive plates constituting a capacitive load cell, at least one of said plates being capable of resilient deformation, said plates being fixedly mounted to the first section whilst being insulated with respect to each other;
   a load transmission element coupled to the second section and adapted to bear on the capacitive load cell so that in response to a load applied to the second section the plates are resiliently displaced towards each other thereby increasing their capacitance,
   signal processing means coupled to the capacitive load cell and responsive to a change in capacitance thereof for generating an output signal representative of the applied load,
   said capacitive load cell and load transmission element being so dimensioned that the output signal is substantially uniform regardless of where on the second section the load is applied, and
   display means for displaying data representative of the output signal.

3. A weighing scale according to claim 2, wherein the capacitive load cell further includes insulating spacing means for maintaining substantially circular first portions of said plates a fixed distance apart at the circumference of said circular first portions;
   said load transmission element being juxtaposed with respect to a first of said plates so as to bear annularly on said first portion about a substantially central circular second portion thereof whose diameter is less than that of said first portion.

4. A weighing scale according to claim 3, wherein the capacitive load cell is dimensioned such that the ratio between
   (i) the diameter of each of said plates to (ii) the external diameter of the load transmission element to
(iii) the spacing between the plates to
(iv) the width of each of said plates is approximately 67:59:1.5:1.2.

5. A weighing scale according to claim 4, wherein the external diameter of the load transmission element is between 40-60 mm.

6. A weighing scale according to claim 2, wherein the load transmission element is formed integral with the second section of said casing.

7. A weighing scale according to claim 2, wherein the capacitive load cell further includes a metallic housing constituting said second plate which contains said first plate therein.

8. A weighing scale according to claim 7, wherein the metallic housing is supported on at least the perimeter of a lower surface thereof by the first section of said split casing.

9. A weighing scale according to claim 7, wherein the metallic housing is supported on its lower surface in such manner that the lower surface deflects in response to an applied load on said scale.

10. A weighing scale according to claim 2, further including biasing means for biasing said first and second capacitor plates towards each other or further apart.

11. A weighing scale according to claim 8, wherein the biasing means is provided by a screw and nut and apertures are provided in said first and second capacitor plates for accommodating said screw.

12. A weighing scale according to claim 2, wherein said plates are made of sheet metal and at least one of the plates is formed so that the spacing between the two plates varies from the centre towards the periphery thereof.

13. A weighing scale according to claim 2, wherein said casing has a major dimension not substantially greater than the width of an average adult shoe and wherein there is furthermore provided a microprocessor for storing a transient signal resulting from a transient loading of the load cell and for sampling successive sections of the signal and for generating a resultant signal corresponding to the true static load.

* * * * *